United States Patent
Weiss et al.

(10) Patent No.: US 6,496,103 B1
(45) Date of Patent: Dec. 17, 2002

(54) DEVICE, SYSTEM AND METHOD FOR SECURE

(75) Inventors: Tal Weiss, Nes-Ziona (IL); Opher Yaron, Tel Aviv (IL)

(73) Assignee: Congruency Inc., Rochelle Park, NJ (US)

( * ) Notice: Subject to any disclaimer, the term of this patent is extended or adjusted under 35 U.S.C. 154(b) by 0 days.

(21) Appl. No.: 09/497,654

(22) Filed: Feb. 4, 2000

(51) Int. Cl.[7] .............................................. H04B 1/00
(52) U.S. Cl. ............... 340/310.01; 340/333; 340/425.2; 455/522; 713/300; 713/310
(58) Field of Search ............................. 340/310.01, 333, 340/425.2, 693.1, 693.2, 693.3, 693.4; 725/79; 713/300, 310, 320, 327, 340, 330; 455/522, 574, 127; 370/311, 317, 331; 379/413, 307

(56) References Cited

U.S. PATENT DOCUMENTS

| | | | | |
|---|---|---|---|---|
| 5,612,580 A | * | 3/1997 | Janonis et al. ................. 307/64 |
| 5,991,885 A | * | 11/1999 | Chang et al. ............... 713/300 |
| 6,115,822 A | * | 9/2000 | Kim et al. ................... 713/310 |
| 6,122,745 A | * | 9/2000 | Wong-Insley ............... 713/300 |
| 6,181,103 B1 | * | 1/2001 | Chen .......................... 320/106 |
| 6,226,525 B1 | * | 5/2001 | Boch et al. ................. 455/522 |
| 6,249,527 B1 | * | 6/2001 | Verthein et al. ............ 370/466 |
| 6,257,982 B1 | * | 7/2001 | Rider et al. .................... 463/31 |

OTHER PUBLICATIONS

PowerDsine Ltd. Website (http://www.powerdsine.com) attached is download of power–over–Lan.

* cited by examiner

*Primary Examiner*—Daniel J. Wu
*Assistant Examiner*—Davetta W. Goins
(74) *Attorney, Agent, or Firm*—Mark M. Friedman

(57) ABSTRACT

A device, system and method for providing power in a secure manner to a network device connected to a network, such as an Ethernet network for example. The device is optionally implemented as an intelligent power supply, which is able to interrogate the network device before power is supplied, in order to determine the electrical capabilities of the device and/or whether the device is authorized to be connected to the network. Such an intelligent power supply preferably communicates with a low power communication device at each network device, which supplies the necessary information upon request.

20 Claims, 3 Drawing Sheets

DEVICE, SYSTEM AND METHOD FOR SECURE

FIELD AND BACKGROUND OF THE INVENTION

The present invention relates to a device, system and method for the secure provision of power to a network device, and in particular, to such a device, system and method in which power is provided while protecting against damage to the network device caused by this power, and/or for preventing unauthorized use of the network by the network device.

Current telephone systems, both analog and digital in a variety of settings, including both home and office use, are highly limited and fixed in functions that they provide. For example, the functionality of such telephones cannot be altered, but rather is limited to the factory-determined features.

In order to increase the flexibility and functionality of such telephony systems, network telephony systems connect a network telephonic device to a server over a packet-switched network such as an IP (Internet Protocol) network, such that these telephony systems may be termed "IP telephony systems". These telephonic devices can receive data through such a network, and therefore can perform various voice mail and other telephonic functions through software on the connected server over the packet-switched network. Clearly, such a system is more flexible, since additional functions can be provided by adjusting software which resides at the server.

An improved and even more flexible system is disclosed in U.S. Provisional Application No. 60/168,395, filed on Dec. 2, 1999. This network telephony system features a flexible, customizable network telephonic device for receiving and transmitting the telephone calls, such that the telephonic device itself is customizable.

Regardless of the type of network telephonic device and system which is used, all such network telephony systems require a local area network (LAN) for serving a plurality of network telephonic devices. One example of a type of network which is suitable for such a LAN is the Ethernet network. One drawback of network telephony systems, such as those operated over an Ethernet network, is the requirement for a power supply for each network telephonic device. Although each telephonic device could be powered from a local AC power outlet, for example, such a requirement for a local power outlet is clearly disadvantageous. Additionally, if the network telephonic device is to also operate while the main AC power supply is interrupted or discontinued, a separate UPS (uninterrupted power supply) is necessary for each network telephonic device.

In an attempt to overcome such disadvantages, various solutions have been proposed for providing power to the network telephonic devices through the Ethernet or other network cables. Since power is provided through the existing network infrastructure, the requirement for additional cables and/or local power outlets is obviated. With regard to Ethernet networks, the most commonly used cables for Ethernet networks have eight wires, of which four are dedicated to data transmission according to the Ethernet standard: wires 1, 2, 3 and 6. The remaining four wires may preferably be used for power supply.

Alternatively, any of the eight wires of the Ethernet cable may be used for power supply, by multiplexing power and data on the same wire. Such multiplexing techniques are known in the art, and are used for example for regular (analog) telephony systems attached to the PSTN (public switched telephony network), where power and voice signals are carried on a single pair of wires. However, using any of the wires of the Ethernet cable which are unused for data transmission may render the network device vulnerable to power surges. For example, wires 4 and 5 are vulnerable to surges if a network device with an Ethernet socket is accidentally connected to the regular (analog) telephony network. Since the Ethernet socket is larger than the analog telephone plug, such a plug could physically-be inserted into the socket, where it would contact wires 4 and 5 of the Ethernet socket. The analog telephony network delivers relatively high voltage, which might damage the connected network device.

One attempted solution for overcoming this problem was proposed by PowerDSine Ltd. (Israel; http://www.powerdsine.com, as of Jan. 12, 2000), in which the power supply attempts to provide power to the network device which is attached to the Ethernet network, and monitors power consumption by this device to sense if the network device can accept power at such a level. While such a detection mechanism may be implemented for automatic operation, it has the disadvantage that power must initially be supplied to the network device at a sufficiently high level to enable the network device to operate. If, in fact, the device which is attached to the network should not be so connected, then supplying even such a relatively low level of power may prove damaging to the device, the network or both. Additionally, providing power in this controlled manner, while monitoring the consumption of power by the attached network device, does not necessarily comply with the power supply requirements of the network device, in which case the network device would not be able to operate with this supply of power.

Furthermore, such a detection mechanism can only test an attached device for the electrical compatibility with the network, but cannot determine whether the device is authorized to be attached to the network with regard to security. For a network telephonic device, for example, such a lack of security could be potentially problematic, since an unauthorized user could theoretically attach such a device to the network for the purposes of wiretapping or fraud, for example. Thus, clearly this attempted solution has a number of drawbacks.

A more useful solution would provide secure power transmission, both with regard to supplying power without damaging the network and attached devices, and with regard to preventing unauthorized users from attaching a device to the network. This solution would also be useful for network devices other than IP telephones, such as other network appliances for example. Unfortunately, such a solution does not exist.

There is thus a need for, and it would be useful to have, a device, system and method for providing secure power transmission through a computer network such as an Ethernet network, preferably including both the prevention of damage to the network device from the transmission of power and the provision of security for attaching only authorized devices to the network.

BRIEF DESCRIPTION OF THE DRAWINGS

The foregoing and other objects, aspects and advantages will be better understood from the following detailed description of a preferred embodiment of the invention with reference to the drawings, wherein.

SUMMARY OF THE INVENTION

Figure 1:
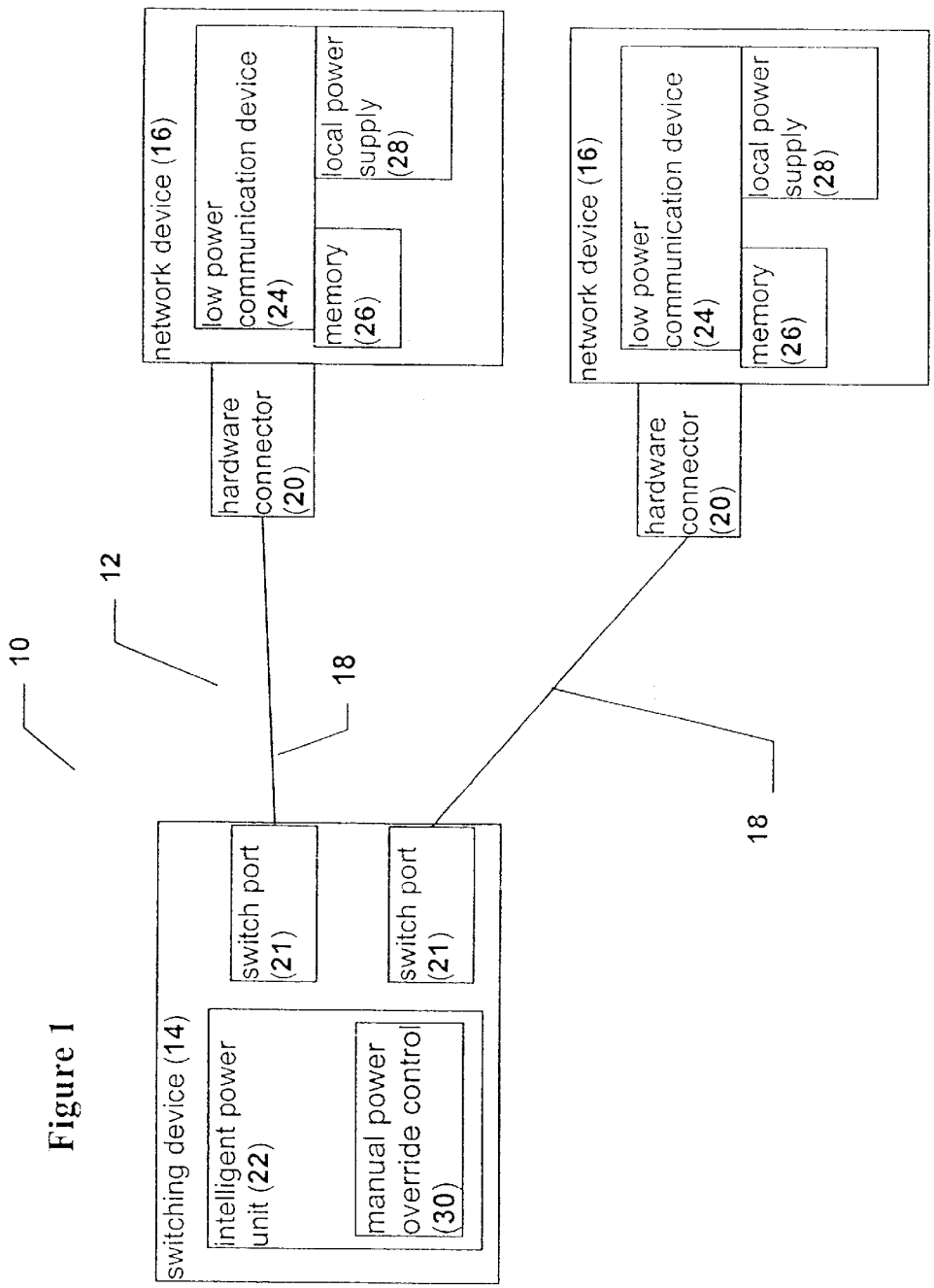
FIG. 1 is a schematic block diagram of an exemplary system according to the present invention.

The present invention is of a device, system and method for providing power in a secure manner to a device connected to a network, such as an Ethernet network for example. The present invention particularly features an intelligent power supply, which is able to interrogate the network device before power is supplied, in order to determine the electrical capabilities of the device and/or whether the device is authorized to be connected to the network. Such an intelligent power supply preferably communicates with a low power communication device at each network device, which supplies the necessary information upon request.

According to the present invention, there is provided a system for supplying power through a data network, the system comprising: (a) a network device for being attached to the data network, for exchanging data through the data network and for receiving the power from the data network; (b) a switching device for exchanging data through the data network with the network device; and (c) an intelligent power unit for interrogating the network device through the data network to determine if the network device should receive power before supplying the power to the network device, such that if the network device should receive the power, the intelligent power unit supplies the power to the network device through the data network.

According to another embodiment of the present invention, there is provided a method for supplying power to a network device through a data network, the method comprising the steps of: (a) interrogating the network device; (b) determining if the network device should receive the power; and (c) if the network device should receive the power, supplying the power to the network device through the data network.

According to still another embodiment of the present invention, there is provided a method for control of supplying power to a remote device, the method comprising the steps of: (a) providing a power supply for supplying the power and a hot swap controller for controlling the power supply, the hot swap controller being local to the power supply and remote from the remote device; and (b) regulating the power supplied to the remote device by the hot swap controller.

According to yet another embodiment of the present invention, there is provided in a system for supplying power through a data network, the system including an intelligent power unit connected to the data network, a network device for receiving power and data from the data network, the network device comprising: (a) a low power communication device for being interrogated by the intelligent power unit to determine if the power should be supplied to the network device; (b) a memory for storing information about the network device, the information being transmitted to the intelligent power unit through the low power communication device; and (c) a hardware connector for connecting the network device to the data network for receiving power and data.

Hereinafter, the term "data network" refers to a connection between any two or more computational devices which permits the transmission of data and power. Hereinafter, unless otherwise stated, the term "network" refers to a data network.

Hereinafter, the term "computational device" includes, but is not limited to, an IP telephone having a real time operating system such as Vx Works™ (Wind River Ltd.); personal computers (PC) having an operating system such as DOS, Windows™, OS/2™ or Linux; Macintosh™ computers; computers having JAVA™-OS as the operating system; graphical workstations such as the computers of Sun Microsystems™ and Silicon Graphics™, and other computers having some version of the UNIX operating system such as AIX™ or SOLARIS™ of Sun Microsystems™, or any other known and available operating system, or any device which can be connected to a packet switched network and which has data processing capabilities, such as a network appliance for example. Hereinafter, the term "Windows™" includes but is not limited to Windows95™, Windows 3.x™ in which "x" is an integer such as "1", Windows NT™, Windows98™, Windows2000™, Windows CE™ and any upgraded versions of these operating systems by Microsoft Corp. (USA).

Hereinafter, the term "switching device" includes, but is not limited to, a hub, a switch, a router, a repeater or any device having a network processor.

The method of the present invention includes a series of steps which could be performed by a data processor, and as such could optionally be implemented as software, hardware or firmware, or a combination thereof. For the present invention, a software application could be written in substantially any suitable programming language, which could easily be selected by one of ordinary skill in the art. The programming language chosen should be compatible with the computational device according to which the software application is executed. Examples of suitable programming languages include, but are not limited to, C, C++ and Java.

DETAILED DESCRIPTION OF THE INVENTION

The present invention is of a device, system and method for providing power in a secure manner to a device connected to a network, such as an Ethernet network for example. By "secure", it is preferably meant that the power is supplied without the risk of damage to the device and/or network itself, and that only authorized devices are able to receive power through the network. Preferably, these goals are met by supplying power with an intelligent power supply, which is able to interrogate the network device before power is supplied, in order to determine the electrical capabilities of the device and/or whether the device is authorized to be connected to the network.

According to a preferred embodiment of the present invention, the intelligent power supply features, in addition to a device for actually supplying the power, a processor for interrogating the network device, and a controller for controlling the supply of power to the network device. The processor is more preferably able to compare the information received from the network device to stored information, in order to determine whether the network device should receive power, for example according to the electrical capability of the device and/or whether the device is authorized to be connected to the network. If the network device should receive power, then the processor preferably instructs the controller to enable power to be transmitted to the network device.

Such an intelligent power supply preferably communicates with a low power communication device at each network device, which supplies the necessary information upon request.

The principles and operation of a device, system and method according to the present invention may be better understood with reference to the drawings and the accompanying description, it being understood that these drawings are given for illustrative purposes only and are not meant to be limiting. It is also understood that although the following description centers around the Ethernet network, the present invention could also be implemented with substantially any type of computer network, with the requirement that the physical layer of such a network would need to be capable of handling both power and data.

Referring now to the drawings, FIG. 1 is a schematic block diagram of an exemplary system according to the present invention. A system 10 features a network 12, which for the purposes of description is assumed to be an Ethernet network. Network 12 features a switching device 14. Switching device 14 is optionally connected to other portions of network 12, and/or to one or more additional networks (not shown). A plurality of network devices 16 are preferably attached directly to switching device 14 through cables 18. Preferably, network devices 16 are network telephonic devices. Each network device 16 features an Ethernet hardware connector 20 for connecting to a particular cable 18. These components are known in the art and could easily be implemented by one of ordinary skill in the art. In order to permit both data and power to be transmitted through an Ethernet hardware connector, Ethernet hardware connector 20 is a combination of power and data components, which are both individually known in the art, and also which are known as a combination, for example in the products of PowerDSine Ltd. (Israel).

Switching device 14 features a component which is not known in the art, which is an intelligent power unit 22. Intelligent power unit 22 is also connected to network 12 through one or more cables 18, such that in this implementation, both data and power are supplied through a switch port 21. Intelligent power unit 22 is able to interrogate each network device 16 with regard to the ability of network device 16 to accept power which is supplied from intelligent power unit 22. In addition, intelligent power unit 22 is optionally and preferably able to identify each network device 16, in order to determine whether that particular network device 16 is authorized to be connected to network 12 through switching device 14.

In order to facilitate these preferred features of intelligent power unit 22, preferably each network device 16, or alternatively hardware connector 20, includes a low power communication device 24 which can operate while network device 16 is not operational, and/or is not supplied with power. Low power communication device 24 is also optionally implemented as a separate "stand-alone" device, which is connected to hardware connector 20 and/or to network 12. In any case, low power communication device 24 preferably includes a memory 26, for storing information about the particular network device 16. Such information optionally and preferably includes, but is not limited to, the level of power required by network device 16, the upper limit of the power which can be handled by network device 16, and identification information for network device 16. Such identification information optionally and more preferably includes, but is not limited to, the specific identity of the particular network device 16, such as a serial number for example; and the general identity of the type of network device 16, such as a model number for example.

Upon interrogation bad intelligent power unit 22, this information is obtained from network device 16 and is preferably transmitted to intelligent power unit 22. As described in greater detail below with regard to FIG. 2, intelligent power unit 22 more preferably compares such information to stored information about authorized network devices 16 in order to characterize network device 16, for example by determining the level of power which can be accepted by network device 16 and/or to determine if network device 16 is authorized to receive such poser. Such at interrogation thus series two purposes, as it enables intelligent power unit 22 to determine that the particular network device 16 is electrically capable of receiving power, at least up to a certain limit, a well as enabling intelligent power unit 22 to determine that th particular network device 16 is authorized to be connected to network 12.

According to optional but preferred embodiments of the present invention, low power communication device 24 is any such device which is capable of communicating with intelligent power unit 22 through two wires: a first wire for data transmission, optional supply of low power to operate low power communication device 24, and the transmission of control and address signals; and a second wire for ground. For implementation with the Ethernet standard, these wires are preferably wires 4 and 5 of the Ethernet cable, shown herein as cable 18. Alternatively, any of the wires of the Ethernet cable may be used for communication between intelligent power unit 22 and low power communication device 24, using known techniques of the art for multiplexing this communication with any other signals on the wires, or switching between this communication and any other signals on the wires. One commercially available example of such a device is the iButton™ device (Dallas Semiconductor Ltd., USA), which includes a low power communication control which uses two wires for data and power transmission, and an internal memory, thereby combining low power communication device 24 with memory 26.

Although low power communication device 24 preferably receives power from intelligent power unit 22, optionally low power communication device 24 is connected to a local power supply 28. Local power supply 28 could be a battery, for example, or any other device for at least temporarily holding a charge for the initial communication with intelligent power unit 22.

Once intelligent power unit 22 has determined that power should be supplied to network device 16, then such power is transmitted through cable 18. Preferably, a single network device 16 is connected to each switch port 21, such that the power transmitted through cable 18 feeds only the particular network device 16. For implementation with Ethernet networks, preferably wires 7 and 8 of cable 18 are used to supply power to network device 16. Alternatively, any of the wires of the Ethernet cable may be used to supply power to network device 16, using known techniques in the art for multiplexing this power with any other signals on the wires, or switching between this power and any other signals on the wires. Optionally, if intelligent power unit 22 determines that power should not be supplied to network device 16, then an alarm/warning is given by intelligent power unit 22, for example in the form of a visible or audible signal. Such an alarm optionally causes switching device 14 to disconnect switch port 21 from the network completely, preventing this network device 16 from having any access to the network. Optionally, intelligent power unit 22 features a manual power override control 30, if the user wishes to supply power to network device 16 regardless of the alarm. For example, network device 16 may be capable of receiving such power, but may not feature low power communication device 24, and therefore may not be able to respond to the interrogation from intelligent power unit 22. Thus, manual power override control 30 preferably enables the human operator/user to determine when power is to be supplied to a particular network device 16 if intelligent power unit 22 determines that such power is not to be automatically supplied.

Figure 2:
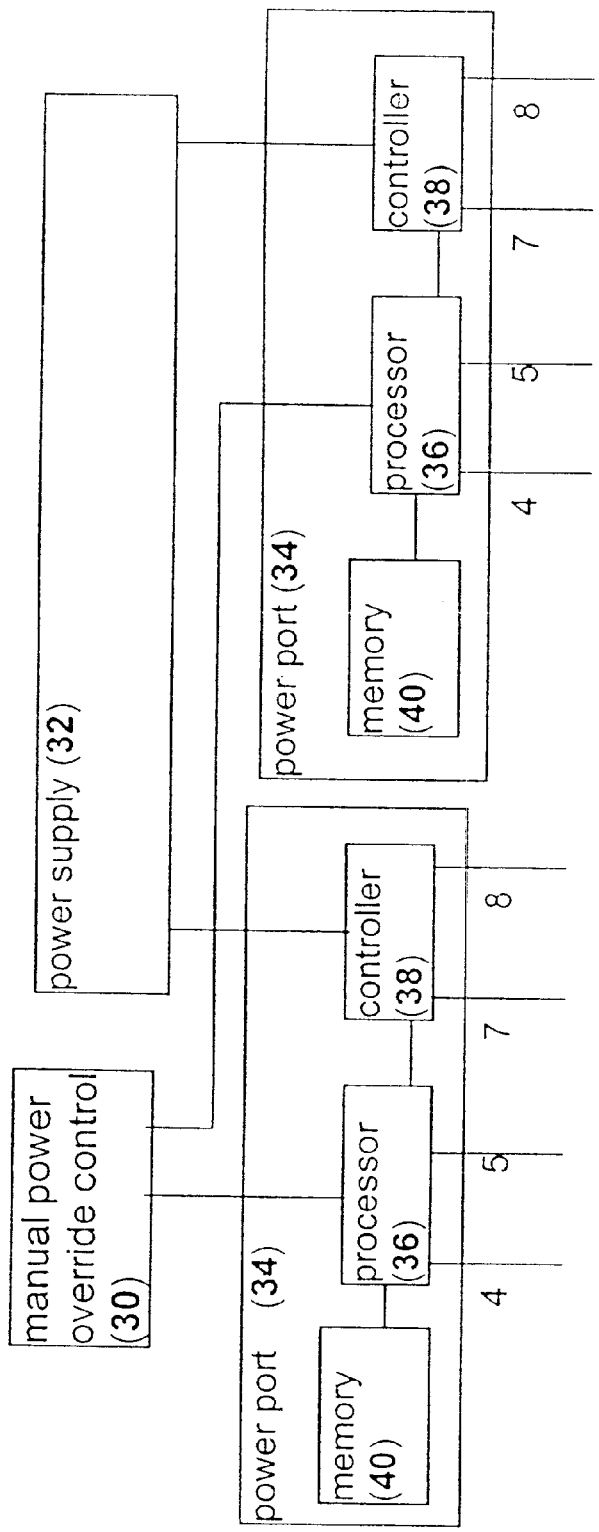
FIG. 2 is a schematic block diagram of a preferred embodiment of an intelligent power supply according to the present invention.

FIG. 2 is a schematic block diagram of a preferred embodiment of intelligent power unit 22 according to the present invention. In this embodiment, intelligent power unit 22 features a power supply 32 for generating the actual power. Power supply 32 is preferably capable of supplying power to a plurality of devices, such that power supply 32 is connected to a plurality of power ports 34. Each power port 34 preferably features a separate processor 36, for performing the interrogation process, and a hardware controller 38, for controlling the supply of power through power port 34. Alternatively, a single processor 36 could control the activity of a plurality of power ports 34 (not shown). Processor 36 is in communication with a memory 40, which contains the necessary data for determining whether the network device (not shown) should receive power. Memory 40 is either provided separately for each power port 34 as shown, or alternatively is shared by a plurality of power ports 34 (not shown).

As previously described, information which is received by processor 36 for comparison with the stored data in memory 40 optionally and preferably includes information related to the electrical capabilities of the network device, and/or for identifying the general identity of the type of network device and/or the specific identity of the particular network device. If processor 36 determines that power should be supplied, then processor 36 communicates with controller 38 to permit power to be transmitted to the network device. As previously described, intelligent power unit 22 optionally features manual power override control 30. If manual power override control 30 is configured to supply power on a particular power port 34, then controller 38 attempts to transmit power regardless of the control received from processor 36. Preferably, processor 36 and/or controller 38 continue to monitor power consumption by the network device (not shown), such that as soon as power is no longer being drawn, controller 38 stops providing power to that particular network device, and processor 36 restarts the interrogation process.

Processor 36 is optionally implemented as a programmable component, such as an FPGA (field programmable gate array), a CPLA (complex programmable logic device) or an ASIC (application-specific integrated circuit), or any type of microcontroller, for example. As shown, interrogation by processor 36 is performed on wires 4 and 5, while power is supplied on wires 7 and 8. However, this implementation is an example only and is not meant to be limiting in any way.

Controller 38 is optionally and preferably implemented as a "hot swap controller", such as the LT1641 device of Linear Technology (USA) or UCC3917 of Texas Instruments Ltd. (USA). In the background art, a hot swap controller is intended to be used in a hardware card which is "hot swappable", or capable of being inserted into a computational device while the power supply to the device is maintained, for local power control.

As used herein, the preferred embodiment of controller 38 as a hot swap controller is used at a central location, specifically at intelligent power supply 22, to supply regulated power to a remote location, such as the particular network device (not shown). This method of use for a hot swap controller for controlling remote provision of power is not known in the art.

Figure 3:
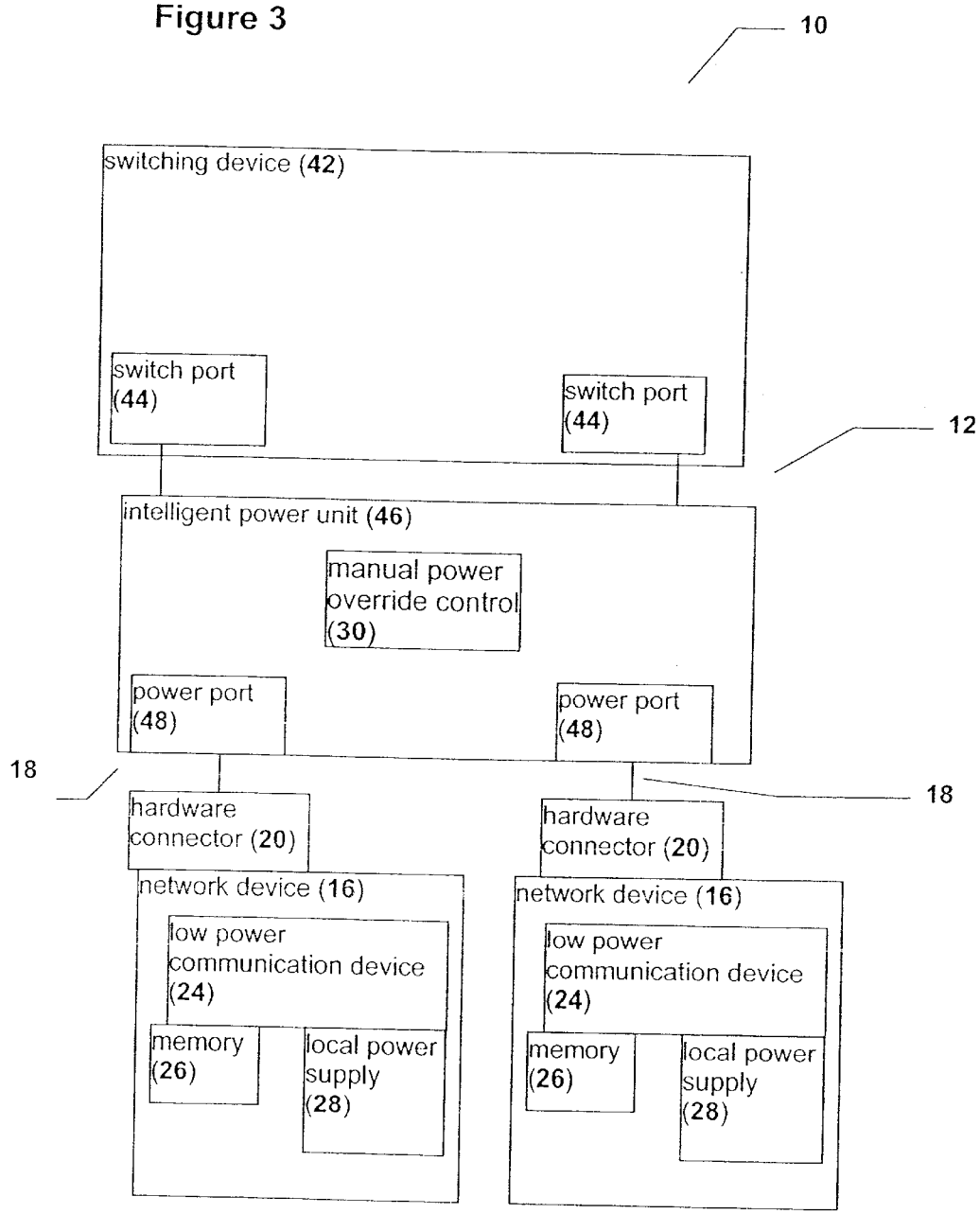
FIG. 3 is a schematic block diagram of a second exemplary system according to the present invention.

FIG. 3 is a schematic block diagram of a second exemplary system according to the present invention, which is similar to the system of FIG. 1. However, as shown in FIG. 3, now system 10 has the following differences from the system of FIG. 1. A switching device 42 is now separate from an intelligent power unit 46. Therefore, each switching port 44 now only carries data transmissions. These data transmissions pass to intelligent power unit 46, which then adds power as previously described, and transmits the combined power and data through each power port 48. The function of network device 16 is not changed. Furthermore, the operation of switching device 42 and intelligent power unit 46, and the reception of power and data, is substantially unchanged with regard to the interaction with network device 16. Thus, the main difference is that intelligent power unit 46 and switching device 42 are two separate entities, which could enable intelligent power unit 46 to be combined with a previously manufactured switching device 42, and/or with a switching device which is known in the art.

It will be appreciated that the above descriptions are intended only to serve as examples, and that many other embodiments are possible within the spirit and the scope of the present invention.

What is claimed is:

1. A system for supplying power through a data network, the system comprising:
   (a) a network device for being attached to the data network, for exchanging data through the data network and for receiving the power through the data network; said network device features a communication device for storing information about said network device;
   (b) a switching device operatively attached to the data network for exchanging data through the data network with said network device; and
   (c) an intelligent power unit operatively connected to said switching device for interrogating said communication device of said network device through the data network to receive said information and to determine if said network device should receive power according to said information before supplying the power to said network device, such that if said network device should receive the power, said intelligent power unit supplies the power to said network device through the data network.

2. The system of claim 1, wherein said information at least includes an identifier for characterizing said network device.

3. The system of claim 2, wherein said intelligent power unit determines an upper limit of an amount of power to be transmitted to said network device according to said identifier.

4. The system of claim 2, wherein said intelligent power unit also determines if said network device is authorized to receive the power according to said identifier.

5. The system of claim 4, wherein said intelligent power unit further includes:
   (i) a power supply for supplying the power;
   (ii) an interrogation processor for interrogating said communication device of said network device; and
   (iii) a hardware controller for controlling said power supply according to an instruction from said interrogation processor.

6. The system of claim 5, wherein said hardware controller is a hot swappable controller.

7. The system of claim 1, wherein the network is an Ethernet network.

8. The system of claim 7, wherein the network features a plurality of cables, and a cable with eight wires connects said network device and said intelligent power unit, such that power is supplied to said network device through wires seven and eight, and said intelligent power unit interrogates said network device through wires four and five.

9. The system of claim 1, wherein said intelligent power unit further includes:
   (i) a power supply for supplying the power;
   (ii) an interrogation processor for interrogating said communication device of said network device; and
   (iii) a hardware controller for controlling said power according to an instruction from said interrogation processor.

10. The system of claim 9, wherein said hardware controller is a hot swappable controller.

11. The system of claim 1, wherein said information at least includes an upper limit to an amount of power for being supplied to said network device.

12. A method for supplying power to a network device through a data network, the method comprising the steps of:
   (a) providing the network device with a communication device for storing, information about the network device;
   (b) interrogating said communication device of the network device through the data network to receive said information;
   (c) determining if the network device should receive the power according to said information; and
   (d) if the network device should receive the power, supplying the power to the network device through the data network.

13. The method of claim 12, wherein step (b), said information at least includes an identifier for characterizing the network device, such that step (c) is performed according to said identifier.

14. The method of claim 13, wherein step (c) includes the step of determining an upper limit of an amount of power to be transmitted to the network device according to said identifier.

15. The method of claim 13, wherein step (c) includes the step of determining if the network device is authorized to receive power according to said identifier.

16. The method of claim 12, wherein step (b) is performed substantially before the network device is operational.

17. In a system for supplying power through a data network, the system including an intelligent power unit connected to the data network, a network device for receiving power and data from the data network, the network device comprising:
   (a) a low power communication device for being interrogated by the intelligent power unit to determine if the power should be supplied to the network device;
   (b) a memory for storing information about the network device, said information being transmitted to the intelligent power unit through said low power communication device; and
   (c) a hardware connector for connecting the network device to the data network for receiving power and data.

18. The system of claim 1, wherein said power that is received by said network device through the data network is operating power.

19. The system of claim 1, wherein said switching device and said network device exchange said data through the data network via a first channel, and wherein said intelligent power unit supplies the power to said network device through the data network via a second channel distinct from said first channel.

20. The system of claim 1, wherein said network device and said switching device are attached to the data network by cables.

* * * * *

UNITED STATES PATENT AND TRADEMARK OFFICE
CERTIFICATE OF CORRECTION

PATENT NO.   : 6,496,103 B1                                                             Page 1 of 1
DATED        : December 17, 2002
INVENTOR(S)  : Weiss et al.

It is certified that error appears in the above-identified patent and that said Letters Patent is hereby corrected as shown below:

<u>Title page, Item [54], and Column 1, Line 1,</u>
Insert -- DEVICE, SYSTEM AND METHOD FOR SECURE PROVISION OF POWER TO A NETWORK DEVICE. --

Signed and Sealed this

Eleventh Day of March, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,496,103 B1
DATED         : December 17, 2002
INVENTOR(S)   : Weiss It is certified that error appears in the above-identified patent and that said Letters Patent is hereby corrected as shown below:

Title page,
Item [73], please correct the Assignee to: -- Congruency Ltd, Petach Tikva, Israel. --

Signed and Sealed this

First Day of July, 2003

JAMES E. ROGAN
*Director of the United States Patent and Trademark Office*